March 3, 1970   J. L. RILEY   3,498,741
SECONDARY CELLULOSE ACETATE WITH HIGH SAFE IRONING
TEMPERATURE AND PROCESS THEREFOR
Filed Aug. 27, 1965   4 Sheets-Sheet 1

FIG. I

JESSE L. RILEY INVENTOR.

BY Leonard Horn

JESSE L. RILEY INVENTOR.

BY Leonard Horn

March 3, 1970 J. L. RILEY 3,498,741
SECONDARY CELLULOSE ACETATE WITH HIGH SAFE IRONING
TEMPERATURE AND PROCESS THEREFOR
Filed Aug. 27, 1965 4 Sheets-Sheet 3

JESSE L. RILEY INVENTOR.

BY Leonard Horn

JESSE L. RILEY
 INVENTOR.

BY Leonard Horn

United States Patent Office 3,498,741
Patented Mar. 3, 1970

3,498,741
SECONDARY CELLULOSE ACETATE WITH HIGH SAFE IRONING TEMPERATURE AND PROCESS THEREFOR
Jesse L. Riley, Charlotte, N.C., assignor to Celanese Corporation, New York, N.Y., a corporation of Delaware
Filed Aug. 27, 1965, Ser. No. 483,198
Int. Cl. D06m 5/14
U.S. Cl. 8—131                                 19 Claims

ABSTRACT OF THE DISCLOSURE

A fabric of secondary cellulose acetate in which the secondary cellulose acetate has an acetyl value of from about 53 to 57.5 percent calculated as combined acetic acid, the filamentary material being crystalline by X-ray diffraction and a process for treating secondary acetate filamentary material comprising subjecting it to a swelling treatment of gradually increasing intensity beginning with a swelling treatment which does not cause coalescence of filaments and then subjecting the filamentary material to a strong swelling treatment which is sufficient to cause coalescence of adjacent filaments of the untreated material, but which does not cause coalescence of filaments of the treated material, the swelling treatments prior to the strong swelling treatment increasing the resistance of the filamentary material to the softening effect of the strong swelling treatment.

---

This invention relates to secondary cellulose acetate filamentary materials and relates more particularly to secondary cellulose acetate filamentary materials of improved resistance to heat and solvents.

Secondary cellulose acetate is a product manufactured by substantially completely acetylating cellulose, to form cellulose triacetate, and then hydrolyzing some of the acetyl groups to produce a product, readily soluble in acetone, having an acetyl content, calculated as combined acetic acid, of, for example, about 53 to 57.5%, usually about 54.5 to 55.0%. To form filamentary materials, useful in the manufacture of textiles and other products, it is usual to to force a solution of the secondary cellulose acetate in a volatile solvent through the fine orifices of a spinneret into a coagulating medium, such as heated air into which the solvent evaporates, to produce continuous filaments of the secondary cellulose acetate.

Fabrics of secondary cellulose have many advantageous properties but their safe ironing (stiffening) temperature is relatively low so that it is necessary to use care in ironing garments made of these fabrics. For example, the safe ironing (stiffening) temperature for secondary acetate fabrics is in the neighborhood of about 170° C., which in some 50–60° C. below the usual temperatures employed for ironing cotton.

It is one object of this invention to provide secondary cellulose fabrics having higher safe ironing temperatures.

Another object of this invention is to provide a secondary cellulose acetate filamentary material of increased dimensional stability.

Other objects of this invention will be apparent from the following detailed description and claims. In this description and claims, all proportions are by weight unless otherwise indicated.

In accordance with one aspect of this invention, a fabric of secondary cellulose acetate is given a swelling treatment of gradually increasing intensity. Initially the severity of the swelling treatment is not such as to cause coalescence of the filaments making up the fabric. At a later stage in the course of the treatment the swelling conditions are so drastic that, if the initial fabric were treated under the same severe conditions its textile nature would be damaged, as by coalescence, or even dissolution, of its filaments.

The fabrics produced by the progressive swelling treatment of this invention have significantaly higher safe ironing (stiffening) temperatures than ordinary secondary cellulose acetate fabrics and they generally show marked crystallinity, as measured by X-ray diffraction. The degree of improvement in these respects will depend on the precise treatment given to the fabric; safe ironing (stiffening) temperatures as high as 40–50° C. above the normal safe ironing (stiffening) temperatures of secondary cellulose acetate fabrics of the same construction have been attained easily.

In the accompanying drawings, which will be described more fully later in this specification:

FIGURES 1 and 2 are X-ray diffraction diagrams of a cellulose acetate treated in accordance with this invention, and of the untreated material; and FIGURES 3–8 are curves obtained on Instron stress strain testing of various treated and untreated cellulose acetate fabrics.

The following examples are given to illustrate this invention further:

Example 1

In this example, the starting material was a woven satin fabric of continuous filaments of secondary cellulose acetate of 55% acetyl value, calculated as combined acetic acid. Specifically the fabric was a 5 shaft satin 180 x 110 fabric whose warp was of 75 denier yarn, 20 filaments per yarn, 2Z twist and whose filling was of 150 denier yarn, 40 filaments per yarn, 2Z twist. After scouring and drying, the fabric was immersed for 10 minutes in a blend of 45 volumes of acetone and 55 volumes of water, and immediately thereafter immersed first for 5 minutes in a blend of 50 volumes of acetone and 50 volumes of water, and then for successive 1 minute periods in acetone-water blends of successively increasing strength, namely 55/45, 60/40 and 65/35 acetone-water v./v. In each stage of treatment, the fabric was in relaxed condition, suspended in a large excess of the treating liquid. The fabric was then scoured in water at room temperature, being immersed in the water for 10 minutes or more. The resulting moist, treated fabric was of substantially the same dimensions as the initial fabric. In contrast, when the initial fabric was immersed in the 60/40 acetone-water mixture it shrank immediately about 25–35%, and its filaments became strongly cemented together.

The safe ironing (stiffening) temperature of the treated fabric was about 210° C.; the safe ironing (stiffening) temperature of the initial fabric was about 170° C.

Fibers taken from the treated fabric of this example were examined by X-ray diffraction. The resulting plot of diffraction intensity, I, vs. diffraction angle, $2\theta$, is shown in FIG. 1 of the drawing. This plot evidences a considerable degree of crystallinity. For comparison, the X-ray diffraction diagram for the fibers of the initial untreated secondary acetate fabric is shown in FIG. 2. Comparison of these two figures shows that the diagram of FIG. 1 has peaks in diffraction intensity, I, at about 9°, 10.5°, 13°, 17° and 21°$2\theta$. In the diagram of FIG. 2 these resolved peaks are absent; instead, as is characteristic of materials of negligible or low crystalline order, there are broad domes from about 7° to 13.5° and 13.5° to 26°$2\theta$. From FIG. 1 the crystalline order index, a ratio of peak height to peak breadth (R. G. Stoll, Textile Research Journal 25, 650–666 [1955]) averaged for the peaks at 9°, 10.5°, 13° and 17°$2\theta$ has a value of 0.9. The corresponding value for FIG. 2 cannot be calculated because of the absence of resolved peaks and may be taken as zero.

The X-ray diffractometer curves in the drawing were obtained by cutting the filamentary material to produce a powdered, completely random sample and examining the sample in a diffractometer using nickel filtered copper Kα radiation.

In the curves in the drawing the angle is indicated as the abscissa and is specified as $2\theta$, this being the angle which the diffracted X-ray beam makes with respect to the incoming X-ray beam, as is well understood by those acquainted with X-ray diffractometer curves. (Klug and Alexander, "X-Ray Diffraction Procedure for Polycrystalline and Amorphous Materials," published 1954 by Wiley & Sons.) The ordinate of each curve is, of course, a measure of the intensity of the diffracted radiation.

In making the plots, the X-ray diffraction pattern was determined by cutting the fibers to powder form and examining a sample of the powder, using a North American Philips Geiger Counter Diffractometer operated under the following conditions: Radiation: Nickel filtered CuKα radiation 35 kv., 14 ma., using both voltage and ma. stabilization. Diffractometer constants: 1° divergence slit; 0.003" receiving slit; 1° scatter slit; 2° $2\theta$/min. scanning speed. Recorder Constants: Ratemeter Scaler—8, Multiplier—0.6 (full scale 240 counts/sec.). Time Constant: 16. Chart Speed: 0.5"/min.

The "safe ironing (stiffening) temperature," referred to above, is determined by the use of a standard hand iron having a weight of five pounds and an area of its sole plate of 22½ square inches. The test is conducted by heating the iron until a selected 2-inch square area of the sole plate adjacent the tip of the iron has the desired temperature. A 2-inch square of the fabric to be tested is placed on an ironing surface comprising a flat board covered with 1 inch of sponge rubber, over which are 4 layers of cotton flannel, and the iron is then placed on the fabric so that the aforesaid selected area of the sole plate coincides with the fabric. The placing of the iron is carried out by hand without any lateral motion of the iron on the fabric and without any application of hand pressure to the iron on the fabric. After the iron has rested on the fabric for exactly 10 seconds, the iron is lifted straight up off the fabric. The test is repeated with the iron heated in 10° C. increments for each test until there is evidence of damage to the fabric, e.g. until the fabric sticks to the iron or becomes boardy. The safe ironing temperature is that temperature which is 10° C. below the temperature at which the first sign of damage to the fabric occurs. Another method for determining safe ironing temperature, more rapidly, is by the use of a block having a series of spaced projections, each such projection having a square flat face, e.g. a 1 inch square face, preferably a 2 inch square face. The block is heated to establish a predetermined temperature gradient from one end to the other, so that the temperature at each projection is known. Thus when the block is laid onto a piece of fabric with its projections in contact with the fabric, the safe ironing temperature can be determined directly by observing which blocks cause damage to the fabric.

Ordinarily, in determining the "safe ironing temperature," color changes in the fabric are also taken into account. Thus, if due to the nature of the finish on the fabric it darkens at a given ironing temperature while retaining its original hand and structure, the fabric is considered to have been heated beyond its safe ironing temperature. In the tests used herein, any color changes have been disregarded so that the effects on the physical nature of the cellulose acetate can be compared more accurately. For this reason the term "safe ironing (stiffening) temperature" has been used rather than the more general term "safe ironing temperature."

Example 2

The untreated fabric of Example 1 was treated by successive immersion in baths of 50/50, 50/45, 60/40, 65/35 and 70/30 acetone-water v./v.; the period of immersion in each bath was about 10 minutes, and the transfers from one bath to the next one were effected within a few seconds. The fabric was taken from the last bath (70/30) and immediately immersed in water, and then dried in air at room temperature. The resulting fabric had a good luster, while the fabric of Example 1 was not lustrous after air-drying. A crease, made in the fabric by folding during the water immersion, was retained. When the treated fabric was immersed in 75/25 acetone-water v./v., it became severely coalesced but retained indications of its woven fabric texture.

The following conversion table for acetone/water blends shows the approximate weight proportions corresponding to the volume proportions used above:

PERCENT ACETONE

| | | | | | | | |
|---|---|---|---|---|---|---|---|
| By volume | 45 | 50 | 55 | 60 | 65 | 70 | 75 |
| By weight | 39.4 | 44.2 | 49.2 | 54.3 | 59.5 | 64.9 | 70.4 |

Example 3

A swatch of the original untreated fabric of Example 1 was hand-pleated and held between two glass plates clasped by a rubber band, and the assembly was successively immersed in baths of 50/50, 55/45 and 60/40 acetone-water v./v. for periods of 20 to 30 minutes in each bath, to provide time for diffusion of the liquid into and through the fabric, and then finally kept for 4 hours in 65/35 acetone-water v./v. The resulting fabric had a sharp pleat which was retained on rinsing in water and drying in air at room temperature.

Example 4

Individual filling yearns were removed from a treated fabric produced as in Example 1. The yarns were highly crimped, the frequency, per inch, of the crimps corresponding to the number of warp threads per inch of fabric. On treatment is relaxed condition for 2 minutes in boiling water, the crimp was retained and the yarn did not shrink or stretch substantially. Yarns similarly removed from the untreated fabric lost substantially all their crimp during the same 2-minute boil off.

Example 5

A taffeta fabric woven of the same secondary acetate warp and filling yearns as described in Example 1, and having a 110 x 70 construction (110 warp yarns and 70 filling ends per inch), was treated in relaxed condition in successive baths of aqueous formic acid of gradually increasing formic acid concentration. The successive baths contained 10, 15, 20, 25, 30, 35, 40, 45 and 50% by volume (v./v.) of formic acid (i.e. 10/90, 15/85, 20/80, 25/75, 30/70, 35/65, 40/60, 45/55 and 50/50 v./v. formic acid/water), and the fabric remained in each bath 10 minutes. It was given a 30 minute water wash on removing from the last bath. The resulting fabric was immediately immersed in water after the last treatment and then dried by hanging at room temperature. The fabric had a smooth, luxurous hand. It retained the soft hand after a 30 minute immersion in 65/35 v./v. acetone/water, indicating that crystallization had occurred. The safe ironing (stiffening) temperature was 195° C.

Example 6

The fabric used as the starting material in Example 5 was similarly treated in relaxed condition in successive baths of 10% and 15% v./v. acetic acid in water, then rinsed 30 minutes in cold running water and dried in air at ambient temperature. A satisfactory hand was retained. A 30 minute exposure to 65% v./v. actone/water resulted in a very slight boardiness of the fabric; in contrast under the same exposure the control fabric showed massive swelling, partial dissolving and, or drying, was converted to a solid piece of cellulose acetate.

Example 7

The fabric used as the starting material in Example 5 was similarly treated in relaxed condition in successive baths of 10, 15 and 20% v./v. cyclohexanone/methanol, rinsed 30 minutes in tap water and dried at room temperature. The resulting fabric was stretchy, having 21% of recoverable stretch in the warp direction. After immersion in 65% v./v. acetone/water, as in Examples 5 and 6, the dried fabric was slightly boardy, more so than the similarly exposed fabric of Example 6. It will be recalled that the fabric treated according to Example 5 did not become boardy in the least on similar exposure.

Example 8

A secondary cellulose acetate woven fabric, similar to that used as the starting material in Example 5, was treated in relaxed condition in the following sequence of acetone/water mixtures for the times indicated: 35% v./v., 30 minutes; 40% v./v., 10 minutes; 45% v./v., 4 minutes; 50% v./v., 2 minutes; 55% v./v., 1 minute; 60% v./v., ½ minute. The safe ironing (stiffening) temperature increased as in Examples 1 and 2, but the general retention of form and appearance of the fabric was better than that in Examples 1 and 2. After each of the foregoing stages of treatment a filling thread from the fabric was tested for strength retention, elongation at break and safe ironing (stiffening) temperature. The strength and elongation were retained to a very high degree until through the 40% v./v. stage of treatment and the product had a fairly high safe ironing (stiffening) temperature. Treatments at concentrations higher than about 40% resulted in a decreased tenacity and elongation, but gave safe ironing (stiffening) temperatures of about 220° C.

Example 9

Example 4 was repeated, except that the fabric was maintained at constant length and pressed against a 16 x 16 mesh wire screen during the treatment by initially placing the fabric over a convexly curved screen and securing both ends of the fabric to the screen, with the fabric pressed tightly against the screen all along its length, and placing the resulting screen-and-fabric assembly in the successive treating baths. The resulting fabric had a pebbled textured surface which was not removed on ironing with a hot iron, or on machine washing in water at 140° F. followed by tumble-drying.

All the examples were carried out at room temperature (about 22° C.) and atmospheric pressure unless otherwise indicated.

While I do not wish to be bound by any theory, I believe that the treatment of the fibers in the initial baths having only a mild swelling action imparts mobility only to the most readily solvated molecules or portions of molecules and permits these to attain a small degree of crystallization. Each progressively stronger solution permits crystallization of an additional portion. There is thus produced a mass containing the originally most solvent-resistant molecules, or portions of molecules, together with a crystalline network formed from the originally least solvent-resistant molecules or portions of molecules. This mass is much more resistant to solution and shrinkage than the original material. The effects are obtained without the need for any stretching treatment to orient the molecules; thus in the above examples, the fabrics were made of ordinary low orientation cellulose acetate continuous filaments. The degree of orientation of the cellulose acetate may be expressed in terms of the birefringence of the regenerated cellulose filaments produced by saponification of the cellulose acetate filaments in an aqueous solution containing 1% caustic and 10% sodium acetate for 1 hour at 65° C., washing and drying. Thus secondary cellulose acetate filaments which have been stretched by 150% will yield regenerated cellulose filaments whose brifringence is about 0.046; Sprague and Noether Textile Research Journal 31, 858–865 (1961). The birefringence of the saponification products of the poorly oriented cellulose acetate filaments which are produced by the preferred treatments of this invention will be less than one-third of this value (e.g. less than 0.015).

The different effects obtained when the treatments of increasing severity are employed, as compared to the effects of a single-shot treatment of the same severity, are illustrated in FIGS. 3 through 8 which are curves obtained on Instron stress strain testing of continuously filament yarns taken from various fabrics. More particularly:

Figure 1:
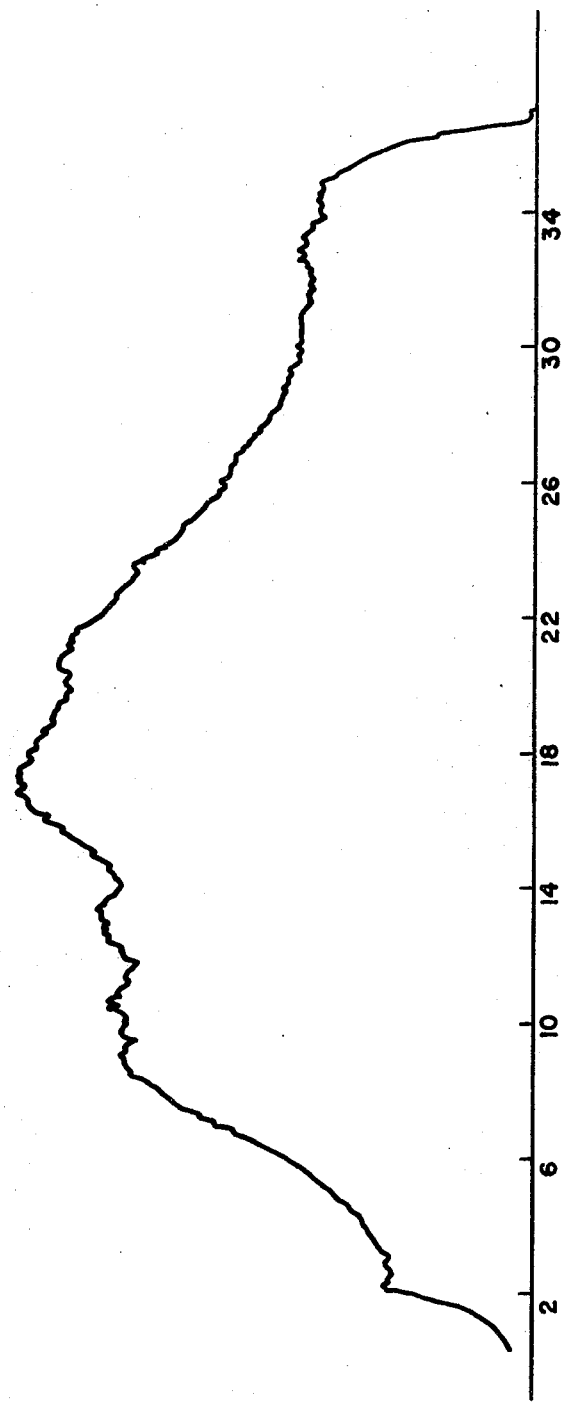
Figure 2:
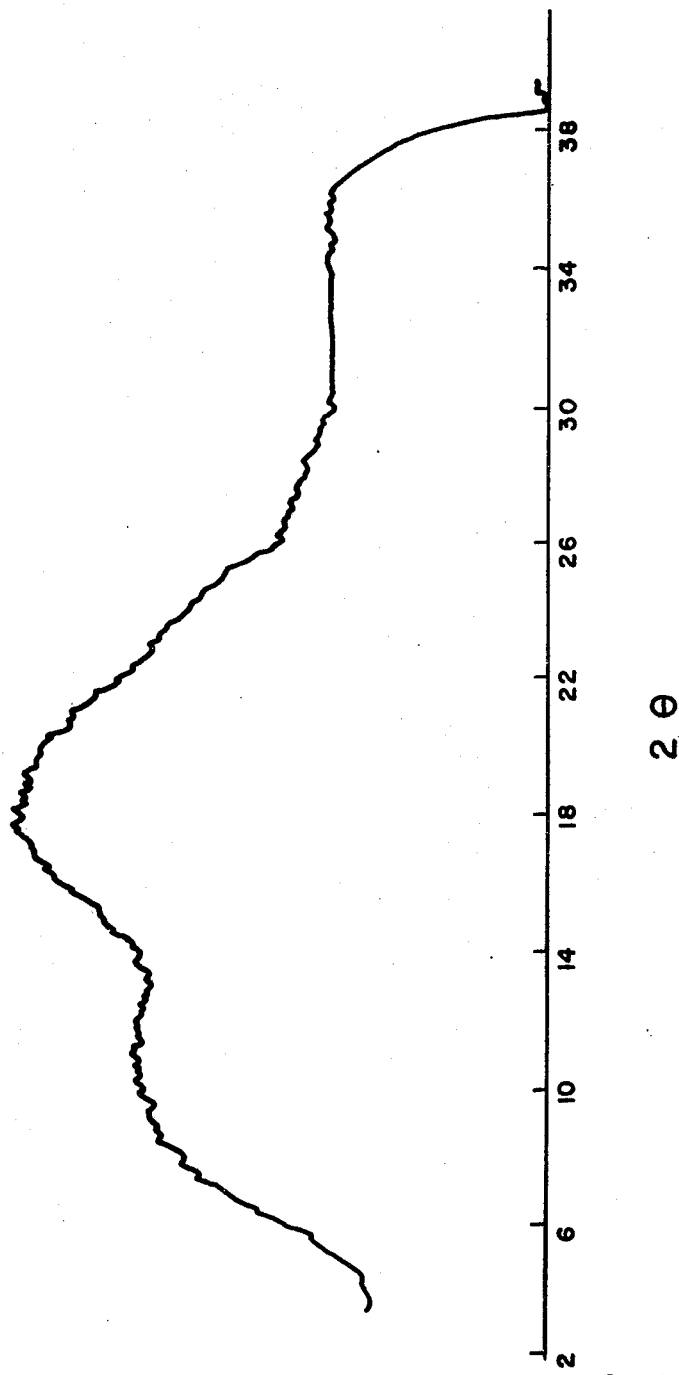
Figure 3:
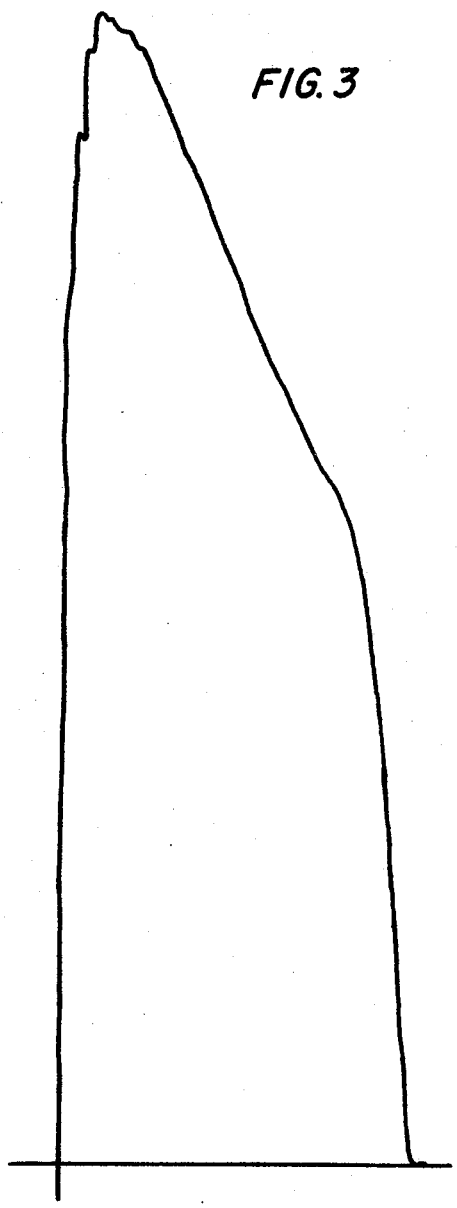
FIGURE 3 is an Instron test curve for a yarn of the starting fabric, of secondary cellulose acetate.
Figure 4:
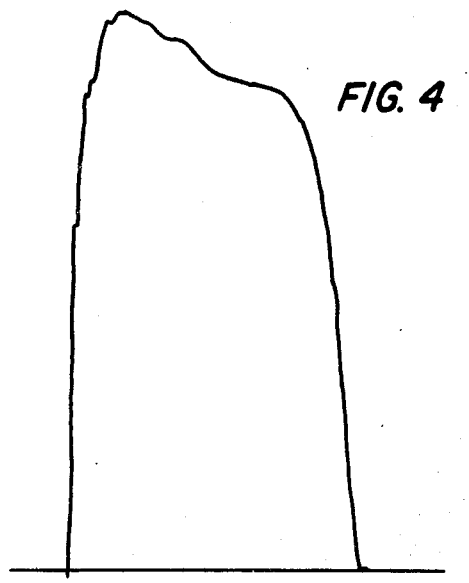
FIGURE 4 is an Instron test curve for a yarn of the same fabric which has been treated, in accordance with this invention, with successive baths of increasing swelling power, the last bath containing 45% acetone/water v./v.
Figure 5:
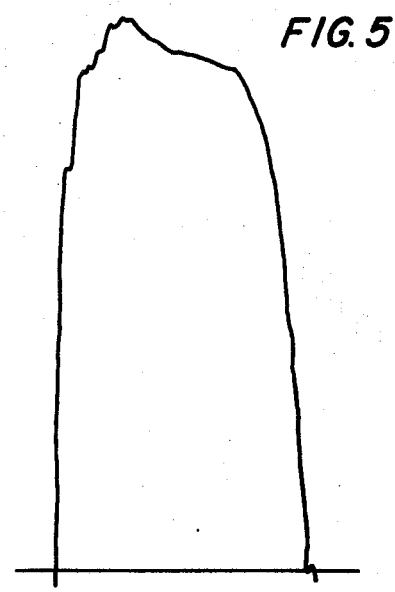
FIGURE 5 is an Instron test curve for a yarn of the same fabric which has been treated, in accordance with this invention, with successive baths of increasing swelling power, the last bath containing 50% acetone/water v./v.
Figure 6:
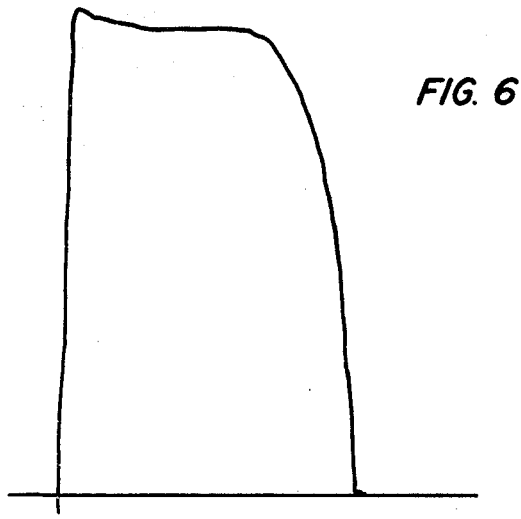
FIGURE 6 is an Instron test curve for a yarn of the same fabric which has been treated, in accordance with this invention, with successive baths of increasing swelling power, the last bath containing 55% acetone/water v./v.
Figure 7:
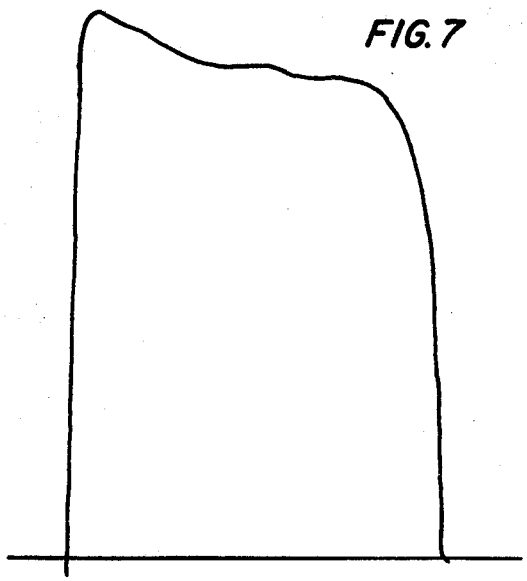
FIGURE 7 is an Instron test curve for a yarn of the same fabric which has been treated, in accordance with this invention, with successive baths of increasing swelling power, the last bath containing 60% acetone/water v./v.
Figure 8:
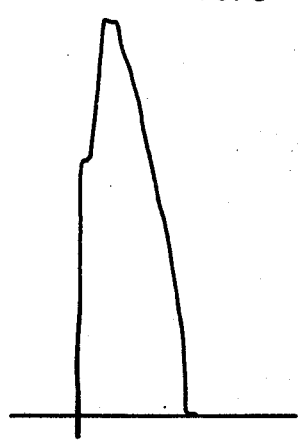
FIGURE 8 is an Instron test curve for a yarn of the same fabric which has been treated (without pretreatment in a bath of lesser swelling power) with a single bath containing 45% acetone/water v./v.

In these curves the vertical coordinates represent the tensile force applied to the yarn and the horizontal coordinates (reading from right to left) represent the relative movement of the two jaws which serve as the pulling elements of the Instron testing device and which are moved apart, relatively, by the testing device at a constant rate. The lower right-hand portion of each curve thus represents the conditions at the start of the test. It will be seen in FIG. 1 (for the untreated material) that as the jaws of the Instron tester move apart, relatively, the force applied to the yarn increases very sharply at first, then increases at a lower rate (so that there is a "knee" in the upwardly rising curve of the applied force), and then drops sharply from a peak, due to breaking of the filaments of the yarn. Knees, more pronounced than that of FIG. 1, are found in the sequentially treated materials of FIGS. 2–5, but are not found in the treated materal of FIG. 6.

The severity of the swelling treatment can be increased in any desired manner. Thus, as illustrated in the examples, the fabric may be placed in successively stronger solutions. Alternatively, the fabric may be kept in a single bath, which may be enriched gradually during the process as by gradually adding the active solvent (e.g. acetone or formic acid), or by gradually increasing the temperature of the bath. It is within the broader aspects of this invention to effect swelling in gaseous media as well as liquids, e.g. in an atmosphere of steam enriched with a suitable agent, such as 1 to 10% acetone, to increase its swelling power. It is also within the broader scope of the invention to use a combined liquid-gas treatment, as by subjecting the fabric to the first few stages of the liquid treatment, followed by more drastic treatment with a heated gaseous swelling agent, or to use steam alone, e.g. saturated steam under pressure, by gradually building up the steam pressure and temperature, e.g. to 135–140° C.

Best results in the practice of this invention are attained by the use of swelling agents which impart a high but suitably controlled degree of mobility to a substantial proportion of the molecules (such as the acetone-water and formic acid-water blends used in the examples above). Swelling treatments which do not produce such a high degree of mobility (e.g. treatments with benzyl alcohol-methanol up to 40/60 or cyclohexanone-methanol up to 55/45) are less desirable. The swelling power of the final bath of the series of treatments is advantageously such that when a filament of the untreated secondary acetate fabric is immersed therein and then dried in air, a substantial shrinkage (e.g. 3 to 5% or more) takes place; in a similar test using an ordinary water bath and drying, practically no shrinkage of the filament takes place. As has been previously noted, the shrinkage on immersion in the final bath of the series, followed by drying, is considerably less when the material has received a sequential treatment in accordance with this invention than when it is immersed in that bath without such preliminary treatment.

The swelling agent used is preferably not too active, however. Thus the use of methylene chloride-methanol mixtures (e.g. in gradually increasing concentrations of 10, 15, 20, 25 and 30 methylene chloride/methanol v./v.) does not give as good results as are obtained with the acetone-water and formic acid-water treatments. The methylene chloride/methanol system is one which has such a large solvent power for cellulose acetate crystals that it dissolves even heat-treated cellulose triacetate filaments at room temperature when the concentration of the more active component (i.e. the methylene chloride) is about 60 to 100%. Such heat-treated cellulose triacetate filaments are highly crystalline (see the Stoll article, previously cited). The preferred swelling systems will not dissolve heat-treated cellulose triacetate at any concentration of the components of the sytem.

While the invention has been illustrated in connection with woven fabric it may also, in its broadest aspects, be applied to other types of fabrics such as knitted fabrics, or to yarns before weaving or knitting. It is particularly useful for treatment of structures in which the secondary cellulose acetate filaments are repetitively bent (e.g. bent 10–150 times per inch), such as woven fabrics, knitted fabrics or crimped yarns since, as shown in Example 4 above, the treatment can make the textures of the filaments resistant even to boiling water. The filaments may be continuous filaments or staple fibers. The treating liquids may contain dyes dissolved, or otherwise dispersed, therein so that the filaments may be simultaneously dyed and treated; for example, a dye may be dissolved in the final swelling bath.

In the foregoing examples, the particular cellulose acetate employed had a viscosity of about 105 centipoises (as measured on a solution containing 3 grams of the dry cellulose acetate in 50 ml. of 98/2 acetone/water at 25° C.). There was substantially no change in the acetyl value of the cellulose acetate as a result of the treatment.

In this specification and claims the compositions of the treating baths have been defined in terms of the concentrations of the active component and the relative ratios of the two components, interchangeably; thus, "15% aqueous formic acid," as used herein, is the same as "15/85 formic acid/water."

The Instron tests whose results are illustrated in FIGS. 3 to 8 were carried out substantially in accordance with A.S.T.M. Standards 1964, Part 24, Specification D–76 (for textile testing machinery) and D–2256 (for strength of yarn, single strand method).

It is to be understood that the foregoing detailed description is given merely by way of illustration, and that variations may be made therein without departing from the spirit of this invention.

The embodiments of the invention in which an exclusive property or privilege is claimed are defined as follows:

1. A fabric of secondary cellulose acetate filamentary material in which the secondary cellulose acetate has an acetyl value of 53–57.5%, calculated as combined acetic acid, said filamentary material being crystalline by X-ray diffraction, and said filamentary material, when in a fabric composed entirely of said filamentary material, exhibiting a safe ironing (stiffening) temperature of at least 10° C. higher than the safe ironing temperature of non-crystalline secondary cellulose acetate filamentary material of the same acetyl content.

2. A fabric as set forth in claim 1 in which the secondary cellulose acetate shows resolved peaks in X-ray diffraction intensity at 9°, 10.5°, 13°, 17° and 21°2θ.

3. Crimped secondary cellulose acetate filamentary material in which the secondary cellulose acetate has an acetyl value of 53–57.5%, calculated as combined acetic acid, said filamentary material being crystalline by X-ray diffraction, said filamentary material, when in a fabric composed entirely of said filamentary material, exhibiting a safe ironing (stiffening) temperature of at least 10° C. higher than the safe ironing temperature of non-crystalline secondary cellulose acetate filamentary material of the same acetyl content.

4. A woven textile fabric of secondary cellulose acetate filamentary material in which the secondary cellulose acetate has an acetyl volue of 53–57.5%, calculated as combined acetic acid, said filamentary material being crystalline by X-ray diffraction, said filamentary material, when in a fabric composed entirely of said filamentary material, exhibiting a safe ironing (stiffening) temperature of about 190–220° C.

5. Crystalline secondary cellulose acetate filaments having an acetyl value of about 53–57.5%, calculated as combined acetic acid, showing resolved peaks in X-ray diffraction intensity at about 9°, 10.5°, 13°, 17° and 21°2θ, and having a low degree of orientation as evidence by a birefringence of less than 0.015 when measured on the regenerated cellulose filaments produced by saponification of said secondary cellulose acetate filaments.

6. Process for treating secondary cellulose acetate filamentary material, which comprises subjecting it to a swelling treatment of gradually increasing intensity, beginning with a swelling treatment which does not produce coalescence of adjacent filaments and during the course of the treatment subjecting said filamentary material to a strong swelling treatment which is of sufficient strength to cause coalescence of adjacent filaments of the untreated material but which does not cause coalescence of adjacent filaments of the treated material, said swelling treatments prior to said strong swelling treatment increasing the resistance of said filament material to the softening effect of said strong swelling treatment.

7. Process as set forth in claim 6 in which said filamentary material is in the form of a woven fabric and the swelling is effected by a blend of a solvent for secondary cellulose acetate and a non-solvent therefor, and in which the concentration of said solvent is gradually increased.

8. Process as set forth in claim 6 in which said solvent is a ketone.

9. Process as set forth in claim 6 in which said solvent is acetone.

10. Process as set forth in claim 6 in which said solvent is a lower aliphatic acid.

11. Process as set forth in claim 6 in which said solvent is a formic acid.

12. Process as set forth in claim 6 in which the treatment is continued until the filamentary material is resistant to 65/35 acetone-water v./v.

13. Process as set forth in claim 6 in which the treatment is continued until the filamentary material is resistant to 40/60 acetone-water v./v.

14. Process as set forth in claim 6 in which said filamentary material comprises repetitively bent yarns of secondary cellulose acetate filaments.

15. Process as set forth in claim 6 in which said filamentary material is a cloth woven of yarns of secondary cellulose acetate filaments.

16. Process as set forth in claim 7 in which the treatment is continued until the safe ironing temperature of the secondary cellulose acetate of said fabric is at least 10° C. higher than the safe ironing temperature of non-crystalline secondary cellulose acetate filamentary material of the same acetyl content.

17. Process as set forth in claim 7 in which the bath of said blend contining the highest concentration of said solvent during said process has a solvent concentration such that when a filament of the untreated cellulose acetate is immersed therein and then dried in air, in relaxed condition, said filament shrinks at least 3%, said solvent and non-solvent being such that their blends, in all relative concentrations, are substantially non-solvents for crystalline heat-treated cellulose triacetate.

18. A fabric as set forth in claim 1 exhibiting a safe-ironing (stiffening) temperature of at least 40–50° C. higher than the safe-ironing temperature of non-crystalline secondary cellulose acetate filamentary material of the same acetyl content.

19. A fabric as set forth in claim 3 exhibiting a safe-ironing (stiffening) temperature of at least 40–50° C. higher than the safe-ironing temperature of non-crystalline secondary cellulose acetate filament material of the same acetyl content.

References Cited

UNITED STATES PATENTS

| | | | |
|---|---|---|---|
| 1,716,423 | 6/1929 | Clavel | 8—131 |
| 1,808,098 | 6/1931 | Briggs et al. | 8—131 |
| 1,947,928 | 2/1934 | Beck | 8—131 |
| 2,060,113 | 11/1936 | Platt | 8—131 |
| 2,065,996 | 12/1936 | Dreyfus et al. | 8—131 |
| 2,079,133 | 5/1937 | Taylor | 8—131 |
| 2,161,805 | 6/1939 | Dreyfus et al. | 8—131 |
| 2,408,381 | 10/1946 | Dodge | 8—131 |
| 2,862,785 | 12/1958 | Finlayson et al. | 8—131 |
| 2,892,668 | 6/1959 | Schoenberg et al. | 8—131 |
| 3,025,129 | 3/1962 | Finlayson et al. | 8—131 |

NORMAN G. TORCHIN, Primary Examiner

J. E. CALLAGHAN, Assistant Examiner

U.S. Cl. X.R.

8—54.2; 106—196; 161—192